United States Patent
Radomsky et al.

(10) Patent No.: US 9,651,165 B2
(45) Date of Patent: May 16, 2017

(54) SYSTEM FOR WIRELESSLY MONITORING AND PREDICTING FAILURES OF LINEAR VALVES

(71) Applicant: Eltav Wireless Monitoring Ltd., Raanana (IL)

(72) Inventors: Israel Radomsky, Herzliya (IL); Gilad Yanai, Hasharon (IL); Eytan Rogel, Haifa (IL)

(73) Assignee: Eltav Wireless Monitoring Ltd., Raanana (IL)

( * ) Notice: Subject to any disclaimer, the term of this patent is extended or adjusted under 35 U.S.C. 154(b) by 0 days.

(21) Appl. No.: 14/900,546

(22) PCT Filed: Jul. 1, 2014

(86) PCT No.: PCT/IL2014/050589
§ 371 (c)(1),
(2) Date: Dec. 21, 2015

(87) PCT Pub. No.: WO2015/001555
PCT Pub. Date: Jan. 8, 2015

(65) Prior Publication Data
US 2016/0153582 A1    Jun. 2, 2016

(30) Foreign Application Priority Data
Jul. 4, 2013   (IL) .......................................... 227323

(51) Int. Cl.
*F16K 37/00*   (2006.01)
*F16K 1/44*    (2006.01)

(52) U.S. Cl.
CPC .......... *F16K 37/0083* (2013.01); *F16K 1/446* (2013.01)

(58) Field of Classification Search
CPC ............................ F16K 37/0083; F16K 1/446
See application file for complete search history.

(56) References Cited

U.S. PATENT DOCUMENTS

| 4,925,498 A | 5/1990 | Kemmler |
| 5,251,148 A | 10/1993 | Haines et al. |

(Continued)

FOREIGN PATENT DOCUMENTS

| DE | 42 39 431 A1 | 7/1993 |
| EP | 0545846 A1 | 6/1993 |

(Continued)

OTHER PUBLICATIONS

Patent Cooperation Treaty, International Search Report, International Patent Application No. PCT/IL2014/050589, Sep. 30, 2014, 6 Pages.

(Continued)

*Primary Examiner* — Kevin Lee
(74) *Attorney, Agent, or Firm* — Fenwick & West LLP

(57) ABSTRACT

A system for monitoring an operation of a linear actuator-valve pair and for detecting failures at their early development stages, which comprises: (a) a linear valve for opening or closing a channel between two pipes; (b) a linear actuator for driving the valve to either a closed or an open state by fully or partially displacing a stem of the valve; (c) an angular wireless valve monitoring device for monitoring the status of the pair by inspecting an angular orientation of a main shaft, and for reporting the status to a control center; and (d) a linear to angular converter for converting the linear displacement of the stem to an angular progression of the main shaft.

16 Claims, 19 Drawing Sheets

(56) References Cited

U.S. PATENT DOCUMENTS

| | | | |
|---|---|---|---|
| 8,210,197 B2 * | 7/2012 | Jensen et al. | F16K 1/446 137/238 |
| 2003/0136929 A1 | 7/2003 | Clemens et al. | |
| 2005/0145053 A1 * | 7/2005 | Bai et al. | B81B 3/0062 74/469 |
| 2009/0230338 A1 | 9/2009 | Sanders et al. | |
| 2009/0326859 A1 * | 12/2009 | Hammerschmidt et al. | G01D 5/2448 702/151 |
| 2010/0116365 A1 | 5/2010 | McCarty | |

FOREIGN PATENT DOCUMENTS

| | | |
|---|---|---|
| EP | 1 379 803 | 1/2004 |
| EP | 2 126 434 | 12/2009 |
| WO | WO 02/084157 A1 | 10/2002 |
| WO | WO 2008/078323 A1 | 7/2008 |
| WO | WO 2013/183059 A1 | 12/2013 |

OTHER PUBLICATIONS

Patent Cooperation Treaty, Written Opinion of the International Searching Authority, International Patent Application No. PCT/IL2014/050589, Sep. 30, 2014, 4 Pages.

Patent Cooperation Treaty, International Preliminary Report on Patentability, International Patent Application No. PCT/IL2014/050589, Oct. 13, 2015, 12 Pages.

European Extended Search Report, European Application No. 14820499.3, Feb. 28, 2017, 8 pages.

\* cited by examiner

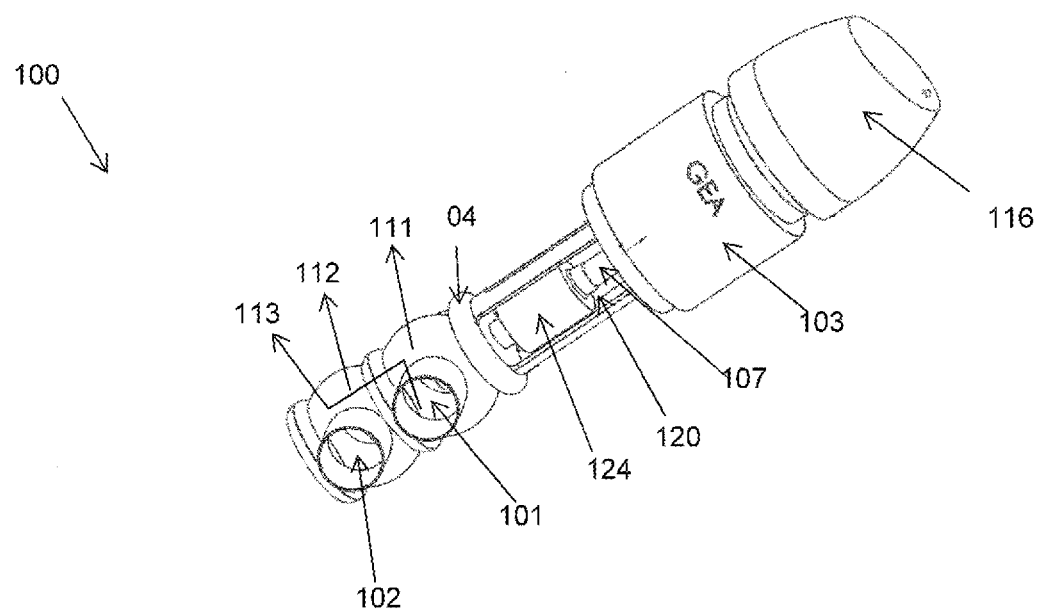
FIG. 1a: Prior Art

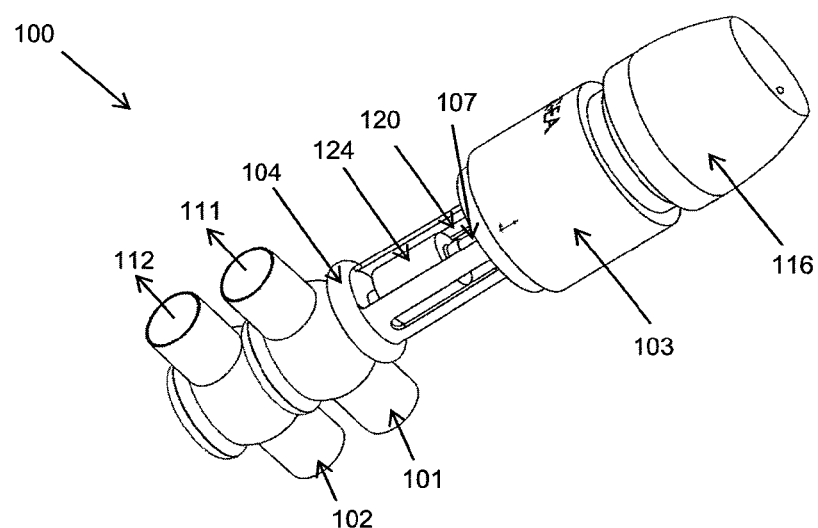
FIG. 1b: Prior Art

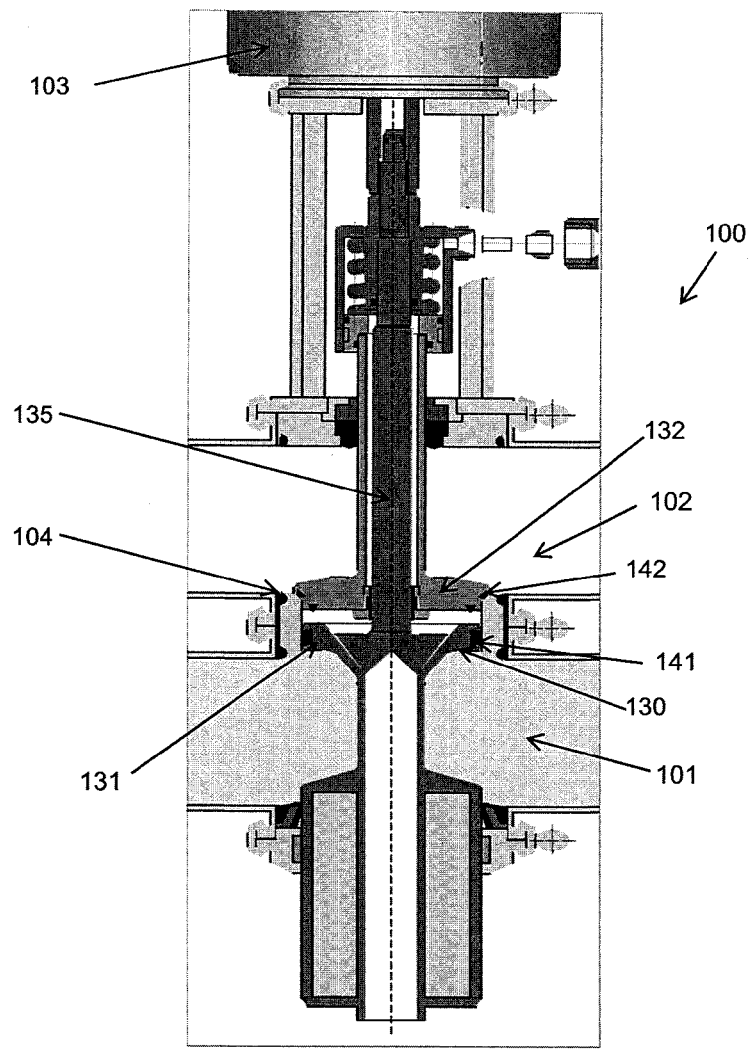
FIG. 2: Prior Art

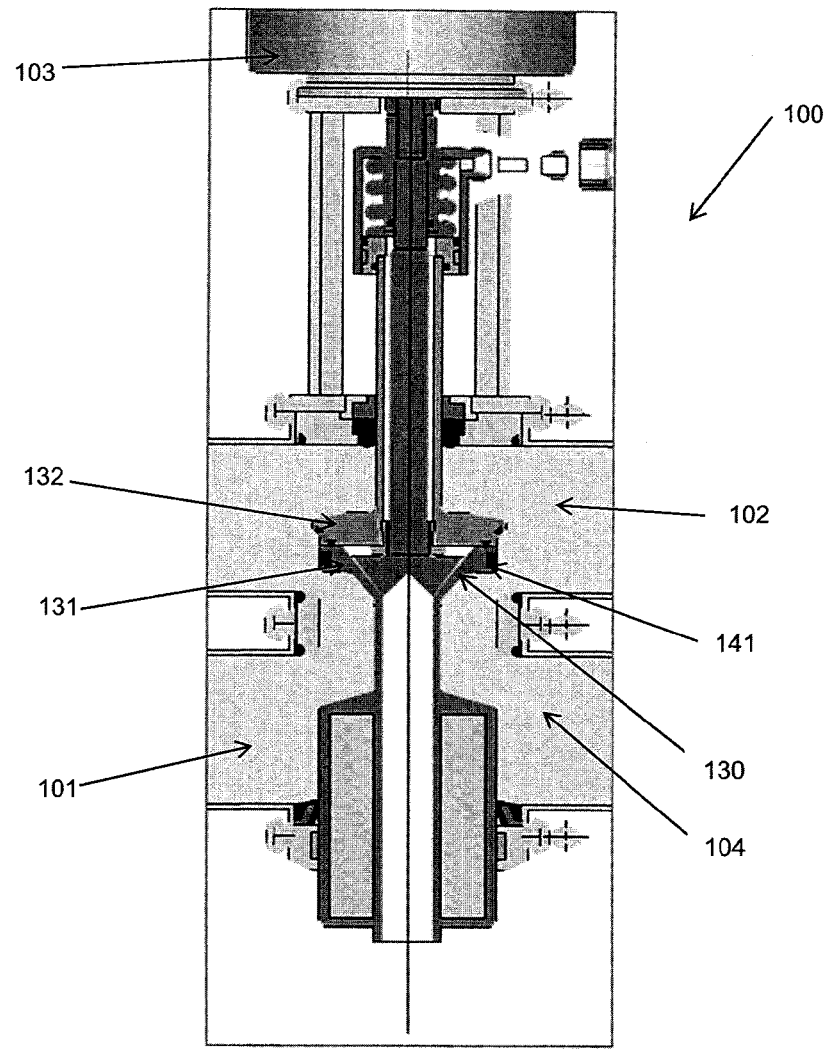
FIG. 3: Prior Art

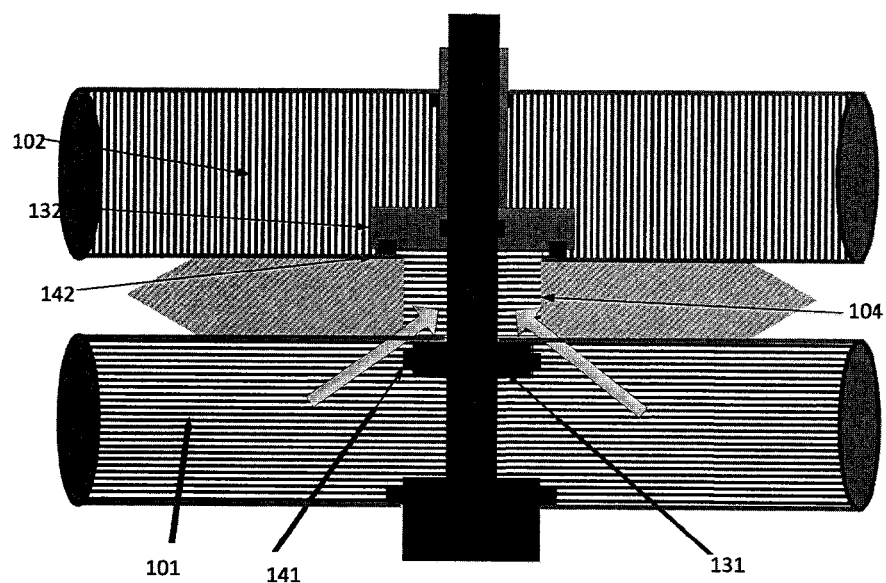
FIG. 4: Prior Art

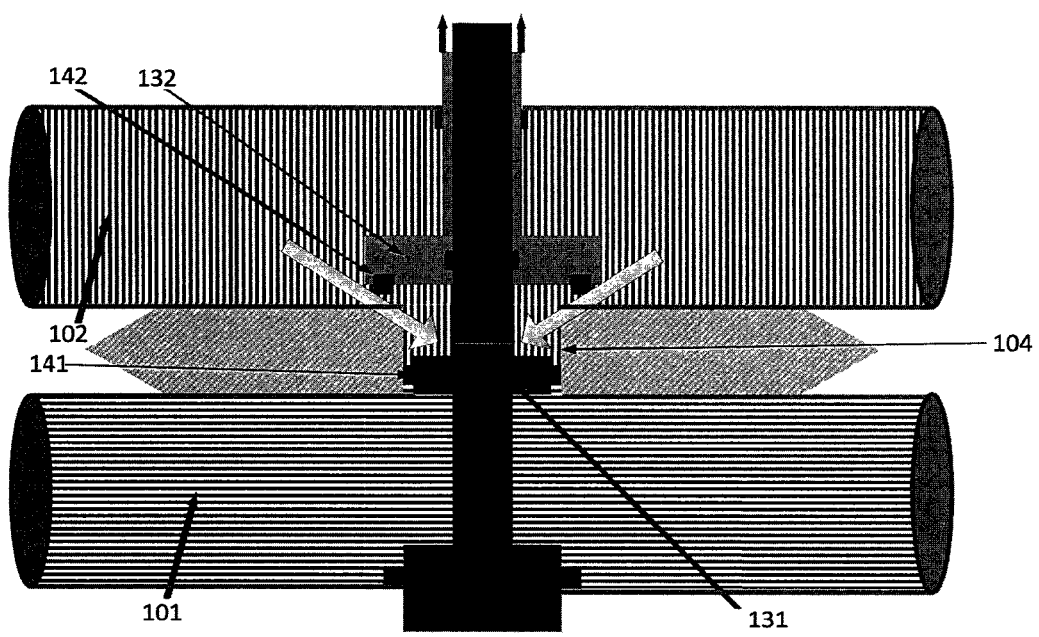
FIG. 5: Prior Art

SYSTEM FOR WIRELESSLY MONITORING AND PREDICTING FAILURES OF LINEAR VALVES

FIELD OF INVENTION

The present invention relates to systems and devices for controlling and monitoring flow of fluids in industrial facilities. More particularly, the invention relates to a system and method for wirelessly monitoring and predicting failures of linear valves.

BACKGROUND OF THE INVENTION

In today's industrial environment, systems and equipment must perform at levels thought impossible a decade ago. Global competition forces the industry to continuously improve process operations, product quality, yield and productivity with fewer people than ever before. Production equipment must deliver unprecedented levels of reliability, availability, and maintainability as plant managers seek ways to reduce operational and support costs and to eliminate or minimize capital investments. In short, industry must invoke new measures to improve production, performance, safety and reliability while minimizing costs and extending the operational life of new and aging equipment.

Valves and pneumatic actuators are important elements in every process industry. WO2008/078323 by same Applicant discloses a device and system for wirelessly monitoring the status, particularly the angular position of valves in an industrial facility. More particularly, this publication discloses an add-on monitoring device which is mounted on a ball valve (also known in the art as a "quarter turn valve"), and a network which is formed from plurality of such monitoring devices. The monitoring devices operate in a short range wireless network, such as Bluetooth, Zigbee, ISA100 or Wireless HART, etc. Each monitoring device reports to a control center via the short range network the status of each respective ball valve.

The monitoring devices of WO2008/078323 may be attached to manually operated quarter turn valves, or to quarter turn valves that are remotely actuated by means of valve actuation devices. The fact that the transmitter of the monitoring device of WO2008/078323 transmits the status of the quarter turn valve either periodically, or upon event, enables the transmitter of the device to stay in a "sleeping state" most of the time, and to "wake up" only at times of necessity for transmitting the status of the valve. In this manner of operation, a relatively compact battery can be used, and such battery can last up to several years.

In another typical aspect, the valve may be rotated (either manually or by means of an actuator) to any desired angular position within the range of 0° to the 90°. The monitoring device of WO2008/078323 is capable of wirelessly reporting in a very high degree of accuracy, the angular position of the stem. In the case of automatic operation, the monitoring device provides a feedback to the control center which enables it to confirm that the desired angular positioning of the valve has indeed been appropriately set.

In another aspect, PCT/IL2013/050494 discloses a system for predicting a future failure of a quarter turn valve actuator. In general, the system of PCT/IL2013/050494 comprises: (a) a sensor for, upon receipt a control command at the actuator, continuously sensing the angular position of the stem of the valve, and conveying to a monitoring unit a respective angular variation signal; and (b) a monitoring unit which comprises: (b1) a sampling unit for receiving said angular variation signal, and producing a transition vector which comprises periodical samples from said angular variation signal; (b2) a local storage for storing nominal transitional values for said actuator-valve pair; and (b3) a local comparator unit for comparing at least a portion of said transitional vector with a corresponding stored set of nominal transitional values, and if a difference above one or more predefined threshold values is determined, issuing an alert for a potential failure of said actuator.

As noted, both WO2008/078323 and PCT/IL2013/050494 are targeted for operation with quarter turn valves. More specifically, WO2008/078323 provides a monitoring device which determines and reports the angular position of a quarter turn valve, and PCT/IL2013/050494 predicts a possible failure of an actuator for a quarter turn valve.

In similarity to quarter turn valves, linear valves are also widely used in the industry for controlling the flow of fluids. However, the monitoring and prediction devices of WO2008/078323 and PCT/IL2013/050494 respectively are incapable of performing said monitoring or prediction tasks in the linear valves environment, as they are both designed for operation only when an angular variation of a stem occurs, as is the case in the quarter turn valves environment.

Typically, a stem of a linear valve is linearly displaced by a distance of several tens of millimeters (for example, 25 millimeters) when switching from an open state to a closed state, or vice versa. In order to monitor the state of the valve, an extension from the stem is typically provided to activate a pair of micro-switches. A first switch from said pair of micro-switches is provided at a first end of the supposed displacement of the extension, while the second switch from said micro-switches is provided at the opposite end of the supposed displacement. In such a manner, the states of the two micro switches respectively provide indication as to whether the valve is in its close state or in its open state.

Linear valves are widely used in the food industry, for example, in the dairy industry. When used in the dairy industry, a continuous and extreme care is required to be maintained in order to keep the pipes, valves, and all associated internal components perfectly clean during operation, in order to avoid development of bacteria. This is particularly important in view of a mass production and fast distribution and use that are typical to products the dairy industry. For example, if cleaning of the pipes and valve components is not perfectly maintained, the health of tens of thousands of people may simultaneously be affected within a very short period (in the order of several hours), even before the failure and contamination is detected. To maintain the pipes, valves, and internal components hygienic in the dairy industry, typically a "double valve" structure is used, and a procedure known as "double lifting" is performed once every several hours. A "double lifting valve" is a structure of two linear valves that are positioned in a channel between two pipes. In the main mode of operation, said two valves may be displaced simultaneously to open the channel between the two pipes thus allowing the material to flow from one pipe to the other. When the two valves are not displaced, there is no flow of material between the pipes due to the seals on the valves. In another mode of operation, when the two valves are in close position, each of said two valves may be displaced independent from the other, while the other valve remains stationary and closed. During times of normal dairy production, an actuator may close or open a channel between two pipes by displacing simultaneously the two valves to a same direction thereby to enable the flow of material between the pipes. The Cleaning In Process (CIP) procedure (which is typically performed once every several hours) is a two-step procedure. The CIP procedure always begins from a state where the two valves are in close position. During the first step, the actuator partially displaces a first of said two valves to a first direction to within the first pipe, while the second valve remains stationary in a state of channel closure. Following the partial displacement, said first valve is flushed by a flow of detergent and water within the first pipe. Upon completion of the flushing of the first valve, the actuator again performs a partial displacement by returning this valve to a position of channel closure (at this stage the channel closure is maintained by both of said two valves). The second step of the CIP procedure is initiated by the actuator partially displacing the second of said two valves to a second direction to within the space of said second pipe, while the first valve remains stationary in a state of channel closure. Following the partial displacement, said second valve is now flushed by a flow of detergent and water within the second pipe. Upon completion of flushing of the second valve, the actuator again performs a partial displacement by returning this valve to a position of channel closure, and the flushing procedure is completed (at this stage again the channel closure is maintained by both of said two valves).

The main open-close linear displacements are typically in the order of 25-50 mm. In contrast, the partial (CIP) displacements are typically much smaller, in the order of 5-10% of said main open-close displacement. More specifically, while the main open-close displacements are in the order of at least 25-50 mm (depending on the specific application), said partial displacements are in the order of 2-4 mm. Unfortunately, said micro-switches arrangement discussed above is capable of sensing displacements in the order of at least 15-20 millimeters, while being incapable of sensing such short displacements of 2-4 millimeters. As a result of this limitation, said two-step CIP procedure is performed without feedback to the control center, i.e., without monitoring the partial displacements of the valve, and without ensuring that the displacements have indeed took place. Clearly, such manner of operation without feedback poses significant risks to the manufacturer (of losing products and material) and to the health of the public. Moreover, the procedure as presently used does not enable any prediction with respect to components failures.

It is therefore an object of the present invention to provide a wireless monitoring system which is particularly adapted for linear valves.

It is still another object of the present invention to provide a wireless monitoring system which is capable of monitoring short displacements of linear valves, as performed particularly during the cleaning procedures in the food industry.

It is still another object of the present invention to provide a monitoring system which is capable of detecting failures in the operation of linear valves.

It is still another object of the present invention to provide a monitoring system which is capable of predicting failures in the operation of linear valves.

It is still another object of the present invention to provide said monitoring, failure detection, and prediction system, which can be easily adapted for linear valves presently in the market.

It is still another object of the present invention to provide said monitoring, failure detection, and prediction system, which is an add-on system.

Other objects and advantages of the invention will become apparent as the description proceeds.

SUMMARY OF THE INVENTION

A system for monitoring an operation of a linear actuator-valve pair and for detecting failures at their early development stages, which comprises: (a) a linear valve for opening or closing a channel between two pipes; (b) a linear actuator for driving said valve to either a closed or an open state by fully or partially displacing a stem of said valve; (c) an angular wireless valve monitoring device for monitoring the status of said pair by inspecting an angular orientation of a main shaft, and for reporting said status to a control center; and a linear to angular converter for converting said linear displacement of said stem to an angular progression of said main shaft.

Preferably, said linear to angular converter comprises: (a) a second transfer element having two ends, wherein at its first end said second transfer element is attached to said valve stem and at its second end said second transfer element is hingedly attached to a first transfer element; and (b) a first transfer element which is hingedly attached to said second transfer element, and which is also attached to a first end of said main shaft, said main shaft being connected at its other end to said angular wireless valve monitoring device.

Preferably said linear valve is a double valve which comprises two individual valves, and wherein said actuator is capable of either simultaneously driving both of said two individual valves, or of individually driving one of said individual valves.

System according to claim 3, wherein two linear to angular converters and two valve monitoring devices are used to monitor both of said individual valves of said double valve.

Preferably, said second transfer element is attached to the stem by means of a ring at its end, which grips said stem.

Preferably, said ring is openable to encompass said stem, thereby to provide a system which is an add-on system.

Preferably, one of said individual valves is individually and partially displaced during a CIP procedure to a space within one of said pipes, for flushing said respective valve by water and detergent, wherein the other individual valve remains in a closed state, closing said channel.

Preferably, said partial displacement is in the order of 3-5 mm.

Preferably, said full displacement is in the order of 20-30 mm or more.

Preferably, each of said individual valves comprises an O-ring capable of sealing said channel, when said individual valve is in said closed state.

Preferably, said angular valve monitoring device is an enhanced angular valve monitoring device which is used for both a purpose of monitoring the status of the valve and for a purpose of failure detection and prediction.

Preferably, said enhanced angular valve monitoring device comprises: (a) a local storage for storing nominal transitional values for said pair of actuator and valve; (b) a sampling unit for receiving an actual angular variation signal from a sensor on a main shaft, and producing a transition vector which comprises periodical samples from said signal; and (c) a comparator unit for: (i) comparing at least a portion of said transitional vector with a corresponding set from said stored nominal transitional values; and (ii) if a difference above one or more predefined threshold values is determined, issuing an alert for a potential failure of said actuator.

Preferably, said transition vector is transmitted to a control center, and a comparison between said nominal transitional values and said transitional vector is performed at the control center.

Preferably, said enhanced angular valve monitoring device predicts and determines failure in at least one of: (a) the linear valve; (b) each of individual linear valves, when a double valve is used; (c) one or more O-rings used in one or more of said valves; and (d) the linear actuator.

Preferably, two linear to angular converters and two valve monitoring devices are used respectively to monitor both of said individual valves of said double valve.

Preferably, said linear to angular converter comprises one or more gears, for converting a linear displacement to an angular displacement.

BRIEF DESCRIPTION OF THE DRAWINGS

In the drawings:

FIGS. 1a and 1b show a prior art structure of a piping system which is typically used in the food industry;

FIG. 2 describes in schematic form the internal structure of a linear valve assembly (actuator and double valve), which is associated with the piping arrangement of FIGS. 1a and 1b;

FIG. 3 shows the linear valve assembly of FIG. 2 in its open state;

FIG. 4 illustrates in schematic form how a CIP cycle is performed by the double-valve structure of FIGS. 2 and 3;

FIG. 5 illustrates in schematic form how an upper valve is flushed during a second step of the CIP cycle;

DETAILED DESCRIPTION OF PREFERRED EMBODIMENTS

Figure 6:
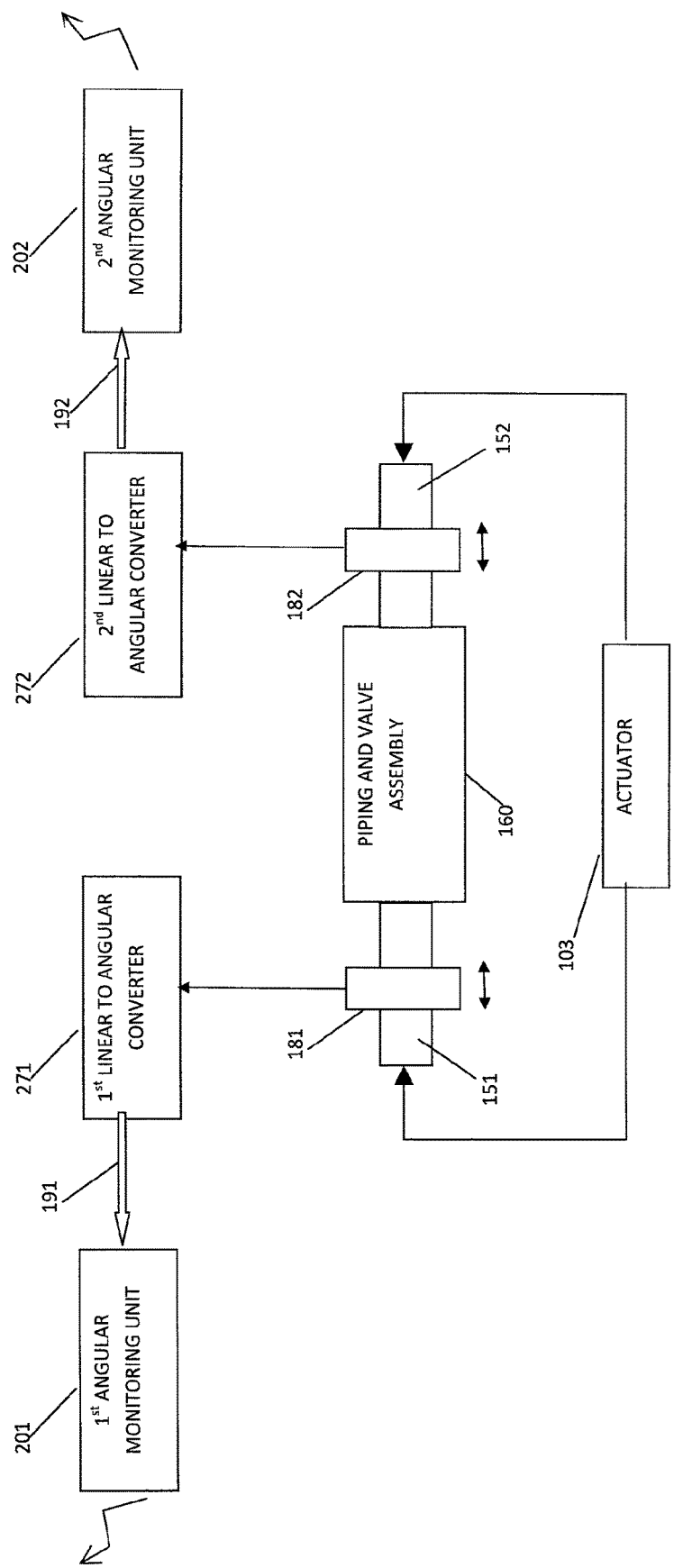
FIG. 6 is a block diagram illustrating the structure of a monitoring and failure prediction and detection system according to an embodiment of the present invention.

The present invention provides a wireless monitoring and failure prediction system for linear valves. The monitoring system of the invention can monitor linear valve displacements in the order of 2-3 millimeters, as typically performed during CIP procedures of double-valves in the food industry. The system of the present invention can also predict development of future failures in said linear actuators and valves, for example, in O-rings that are typically used for said linear valves for sealing the respective channels. It should be noted that although the invention is particularly advantageous when a necessity arises to monitor linear valves displacements in the order of 2-4 millimeters, still the invention can also be applied to monitor much larger displacements. Moreover, even though the description relates to a specific structure which is used in the food, particularly the dairy industry, still the invention may be applied to monitor and predict failures in linear valves and actuators in any other environment.

A typical prior art structure of a piping system 100 which is used in the food industry is shown in FIGS. 1a and 1b. System 100 comprises two adjacent pipes 101 and 102, a linear actuator 103, and a linear "double-valve", which is located at location 104. The double valve at location 104, which comprises two individual valves, is not shown in FIGS. 1a and 1b, as it is internal and masked by non-transparent elements. In normal operation, the double valve either opens or closes (blocks) channel 104 between pipes 101 and 102. When channel 104 is blocked, separate flows of fluids, for example, in the directions of arrows 111 and 112, occur individually within the two pipes 101 and 102 respectively. Upon necessity, for example, to mix the fluid of pipe 101 with the fluid of pipe 102, actuator 103 opens channel 104 by driving a stem 107 of the double valve such that it simultaneously positions both of said individual valves within the space of one of pipes 101 or 102 (for example, within pipe 101). This typical simultaneous positioning of the double-valve involves a linear displacement in the order of at least 25-50 millimeters of the valve's stem 107, which in turn drives the two individual valves simultaneously. Hereinafter, said simultaneous displacement of the stem for full opening or closure of the connecting channel 104 between pipes 101 and 102 will also be referred to as "normal displacement". Upon opening of channel 104, a flow of fluid may flow in the route of arrow 113, i.e. beginning in pipe 101, passing through channel 104, and mixing with the fluid of pipe 102, or in the opposite direction.

The actuator and double-valve are components that are well known in the art. As noted above, in addition to said typical closure and opening displacement, a two-step CIP procedure, which involves much smaller displacements, is also common in the food industry. In a first step, actuator 103 partially drives a first individual valve from said double valve structure to within a space of one of the pipes 101 or 102, while the second individual valve maintains full closure of the channel 104. This partial driving involves displacement in the order of 2-4 millimeters of the first valve, which follows by flushing of the valve by means of detergent and water flowing within pipe 101. Upon completion of flushing of the first valve, this valve is displaced back to its original position to join the second individual valve in closing of channel 104. In a second step, the second valve is individually displaced by 2-4 millimeters to within the space of pipe 102, and the same flushing procedure repeats with respect to the second valve. Upon completion of the flushing of the second valve, the second valve is driven back to its original position in which channel 104 is blocked by means of said first and second individual valves.

Typically, the stem of the double valve passes through an open space 120. An extension 124 from the stem is typically provided to activate respectively one of two micro-switches (not shown) that are provided at two opposite locations of the open space. In such a manner, and based on the stem 107 position, a respective indication with respect to the full opening or full closure of the channel is provided. Wires from the micro-switches typically lead the switches indication to a monitoring unit 116 that may convey the valve's state to a control center. However, this indication is limited to the case of where a full displacement of at least 25-50 millimeters occurs, but this micro switch structure is inapplicable for sensing very short displacements (in the order of 2-3 millimeters), as occur during the CIP procedure.

FIG. 2 describes in schematic form the internal structure of a linear valve assembly (actuator and double valve) 100, which is associated with the piping arrangement of FIGS. 1a and 1b. The actuator 103 linearly drives the stem 135 in order to cause opening or closure of the double valve 130. Double valve 130 comprises two individual valves 131 and 132 respectively. Actuator 103 drives the two valves 131 and 132 simultaneously in order to open or close the cannel 104. In FIG. 2 channel 104 is shown in its closed state. Each of the two individual valves 131 and 132 comprises an O-ring gasket, 141 and 142 respectively, for sealing the channel 104 when necessary. A full sealing of channel 104 may be obtained by a single valve 131 or 132, or alternatively by both valves while they are placed in their respective sealing positions. In the example of FIGS. 2, 3, 4, and 5, O-ring 141 is seated within a peripheral groove at valve 131, while O-ring 142 is seated within a groove at a bottom surface of valve 132. However, this is an example only, as alternatively both of the O-rings may be either peripheral or positioned on a top or a bottom surface of the valves.

FIG. 3 shows the linear valve assembly 100 of FIG. 2 in its open state. As shown both of the individual valves 141 and 142 are displaced together by actuator 103 to within the space of pipe 102, thereby to open channel 104, and to enable fluid flow between the two pipes 101 and 102. As already noted, the displacement is typically in the order of 25-50 millimeters (relative to the closed state of FIG. 2), i.e., a large enough displacement to be monitored by the two micro-switches structure as discussed above.

FIG. 4 illustrates in schematic form how a CIP cycle is performed by the double-valve structure of FIGS. 2 and 3. In a first step, the lower valve 131 is displaced by 2-4 millimeters to within the space of pipe 102, while the upper valve 132 remains in its closed sealing position (O-ring 142 seals channel 104). In such a manner, a fluid flow between pipes 101 and 102 through channel 104 is prevented. On the other hand, a flow of water and detergent within pipe 101 can reach the O-ring 141, as well as the entirety of valve 131 and flush them. The first step of the CIP cycle ends by valve 131 returning to its closed position. FIG. 5 illustrates in schematic form how the upper valve 132 is flushed during a second step of the CIP cycle. In the second step, the upper valve 132 is displaced by 2-4 millimeters to within the space of pipe 102, while valve 131 remains in its closed sealing position, sealing the possible flow of fluid from pipe 101 to pipe 102, and vice versa. On the other hand, a flow of water and detergent within pipe 102 can reach the O-ring 142, as well as the entirety of valve 132, and flush them. At the end of said second step of the CIP cycle, valve 132 returns to its sealing state. Again, the maximal displacement of valve 132 is in the order of 2-4 millimeters, which cannot be sensed by the micro-switch structure.

The present invention overcomes said drawback of the prior art system, which does not enable monitoring of a partial displacement. The term "partial displacement" refers herein to a displacement in the order of about 2-5 millimeter, which takes place, for example, during a CIP procedure such as the one described above.

FIG. 6 is a block diagram illustrating the structure of the monitoring and failure prediction and detection system of the present invention. Actuator 103 linearly drives two stems, 151 and 152, that are in turn connected respectively to the two individual valves 131 and 132 (not shown in FIG. 6) of FIGS. 2-5. The valves and piping assembly 160 is substantially the same structure as illustrated in FIGS. 2-5. Actuator 103 may drive stems 151 and 152 either simultaneously, or individually, in a manner as previously described with respect to FIGS. 2-5. When actuator 103 drives the stems 151 and 152 simultaneously, these stems are displaced by 25-50 millimeters for effecting full opening or full closure of channel 104 (shown in the previous Figures). When actuator 103 drives one of the stems 151 and 152 individually during a the first and second steps of the CIP cycle respectively, the stems are driven by only 2-4 millimeters in a manner as also described above. The $1^{st}$ linear to angular converter 271, as well as the $2^{nd}$ linear to angular converter 272 are each attached to the $1^{st}$ and $2^{nd}$ stems 151 and 152 respectively by means of respective gripping rings 181 and 182. Gripping rings 181 and 182 are therefore linearly displaced together with of stems 151 and 152, and they transfer said linear displacements to the $1^{st}$ and $2^{nd}$ linear to angular converters 271 and 272 respectively. The $1^{st}$ and $2^{nd}$ linear to angular converters 271 and 272 are mechanical arrangements that convert the linear displacement as received from rings 181 and 182 respectively to an angular rotation of shafts 191 and 192 respectively. Each of the shafts 191 and 192 rotates in an angular rotation which is proportional to the linear displacements of stems 151 and 152 respectively. Each of the shafts 191 and 192 transfers its rotation to the $1^{st}$ and $2^{nd}$ angular monitoring units 201 and 202 respectively. The angular monitoring units are wireless units, having a structure as fully described in WO2008/078323 (hereinafter, when the expression "angular monitoring unit" is used, this term refers to a unit having essentially the structure and features of the unit as described in WO2008/078323). Therefore, each of the angular monitoring units 201 and 202 can measure an angular rotation in a very accurate manner. Therefore, the monitoring units can easily sense very small displacements of as short as 2-4 millimeters. This accuracy in fact depends on the mechanical transfer proportion between the linear displacement and the radius of the shafts 191 and 192. More specifically, as the displacements (either 25-50 mm or 2-4 mm) are given, and fixed, any reduction in the radius of the shafts 191 and 192 will result in a larger angular change, and typically higher accuracy.

EXAMPLE 1

For example, the 25-50 mm linear displacement may be converted to a 90° rotation of each of the shafts 191 or 192. In that case, a 2 mm CIP displacement will be converted to 7.2° shaft rotation (in 25 mm main displacement, this corresponds to 2/25*90=7.2°) and 3.6° shaft rotation (in 50 mm main displacement this corresponds to 2/50*90=3.6°) and in case of 4 mm CIP displacement this will be converted to 14.4° shaft rotation (in 25 mm main this corresponds to 4/25*90=14.4°) and 7.2° shaft rotation (in 50 mm main displacement this corresponds to (4/50*90=7.2°). The angular measurement is 10 bits/1000 points accuracy, thus each 1° rotation will yield 11 measurement points, which will result in 11 points of measurements at the minimal rotation of 3.6°. Thus, the angular resolution measurement of the 201 and 202 first and second angular monitoring units is precise enough to accurately measure the CIP displacement As shown, in such structure even small displacements in the order of 2-4 mm can be easily detected, monitored, and even inspected in high accuracy, as it is converted to a significant measurement variation. This is in contrast to the prior art arrangement which involves use of micro switches, and which is limited to sensing of only much larger displacements.

Figure 7:
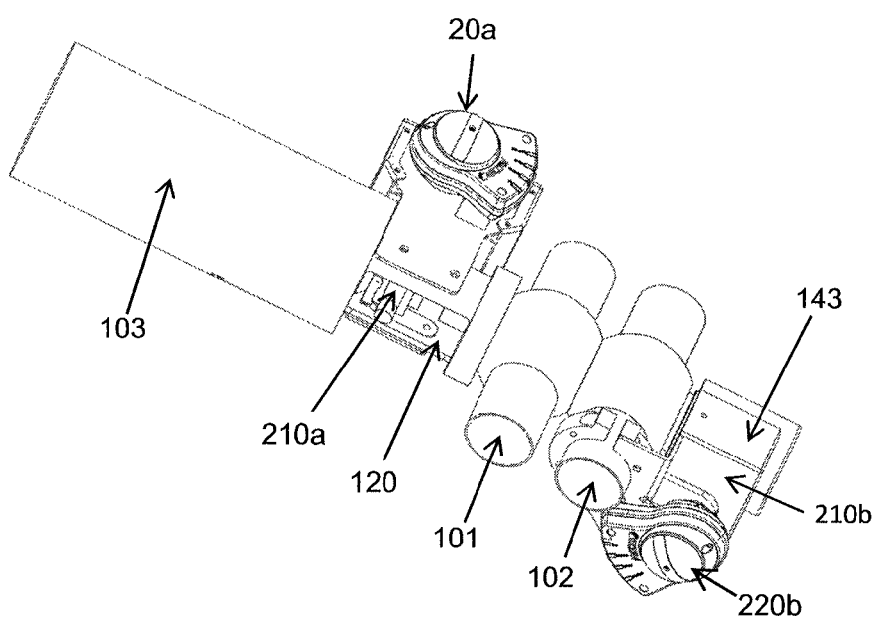
FIG. 7 shows a system for monitoring a linear displacement in a double-valve structure, according to an embodiment of the present invention.

FIG. 7 shows a system for monitoring a linear displacement in a double-valve structure, according to an embodiment of the present invention. The system comprises a linear actuator 103, which is connected to a valve stem which in turn passes through open space 120. The stem continues through the double valve, and ends at a second double space below frame 143. It should be noted that for the sake of simplicity the term "stem" is used in a singular form to describe this structure, however, in fact this stem comprises a more complicated structure, that as said allows activation of the two valves (101 and 102 of FIGS. 2-5) simultaneously as is used during main opening and closure, or separately each individual valve, as is used during the two steps of the CIP cycle. The system further comprises two angular monitoring units 220a and 220b, for monitoring the displacements of valves 131 and 132 respectively (shown in FIGS. 2-4). Each monitoring unit is connected to a respective portion of stem 103 by means of a linear to angular converter 210a and 210b, as described before. Frame 143 is typically used for attachment of the converter to the valve assembly by means of screws, and for containing the various mechanical components.

Figure 16:
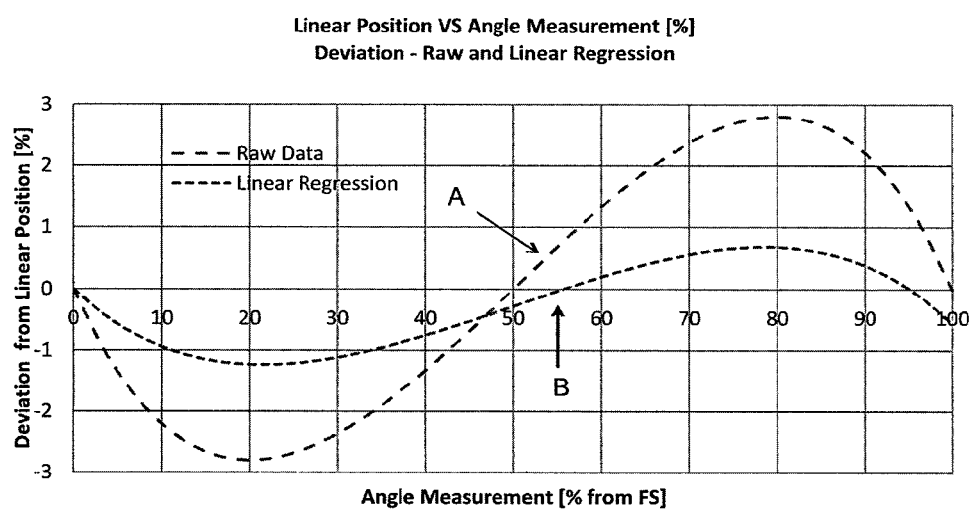
FIG. 16 describes the accuracy of the linear to angular translation.

FIG. 16 describes the accuracy of the linear to angular translation. Axis X is the measured angle in percentage from Full Scale (FS), which will result in the measured deviation from the actual linear movement from FS in percentage. Two lines are shown. Line A is the deviation of the linear translation of the raw data compared to actual location of the linear movement, and Line B is the deviation after linear regression processing of the raw data from the actual location of the linear movement. Better than 1% deviation is achieved after the linear regression processing.

If a more precise presentation is required, the 1% deviation from the real linear valve position can be fixed if the opposite deviation chart is used before presenting the linear valve position.

Figure 8A:
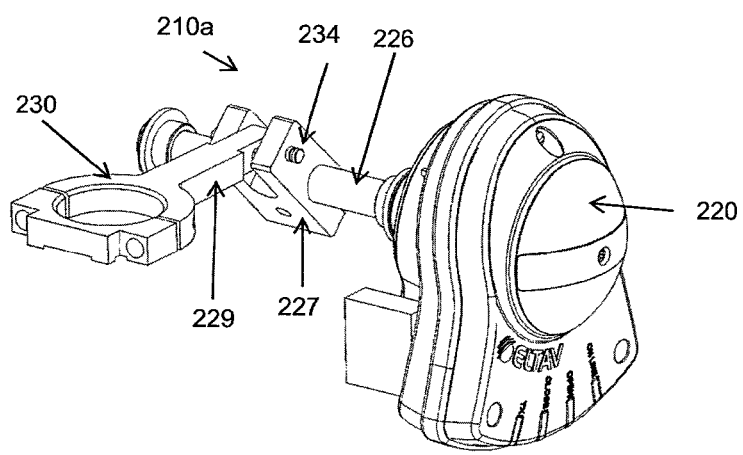
FIGS. 8a and 8b show the two linear to angular converters in details.
Figure 8B:
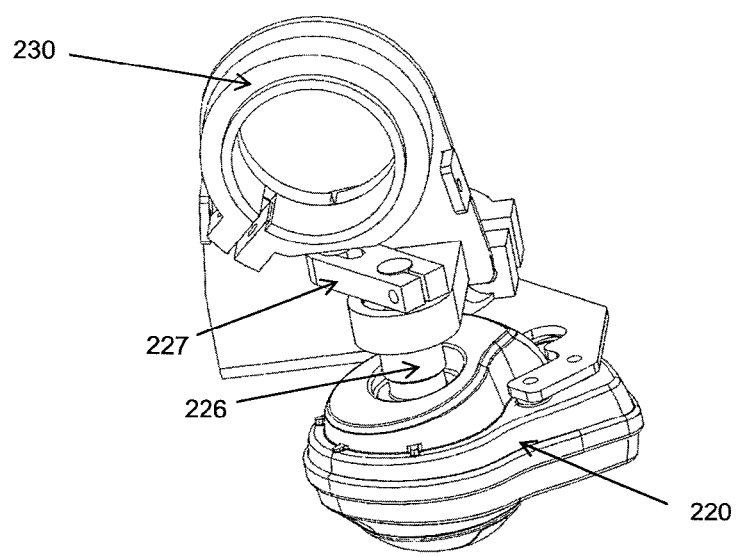

FIGS. 8a and 8b show the two linear to angular converters 210a and 210b in more details. Each linear to angular converter 210a and 210b is joined to an angular monitoring unit 220. More specifically, angular monitoring unit 220 is joined to main shaft 226, which is in turn attached to a first transfer element 227. The first transfer element 227 is axially attached to a second transfer element 229 by means of secondary shaft 234. The second transfer element 229 ends with a ring 230 which grips a respective stem 107 (not shown in FIGS. 8a and 8b). This structure converts the linear displacement of the respective stem 107 to an angular rotation of main shaft 226. The angular rotation of the main shaft is proportional to the linear displacement of the stem. This arrangement enables selection (or adjustment, if necessary) of the proportion of the linear to angular conversion, for example by selecting an appropriate distance between the axis of main shaft 226 and the axis of the secondary shaft 234. More specifically, the larger this distance becomes, a larger angular rotation will result for a given linear displacement of stem 107. Ring 230 is dividable into two halves, thereby enabling easy installation and attachment of the converter to the respective stem 107 by ring 230, particularly easy installation of the system as an add-on unit.

Figure 9:
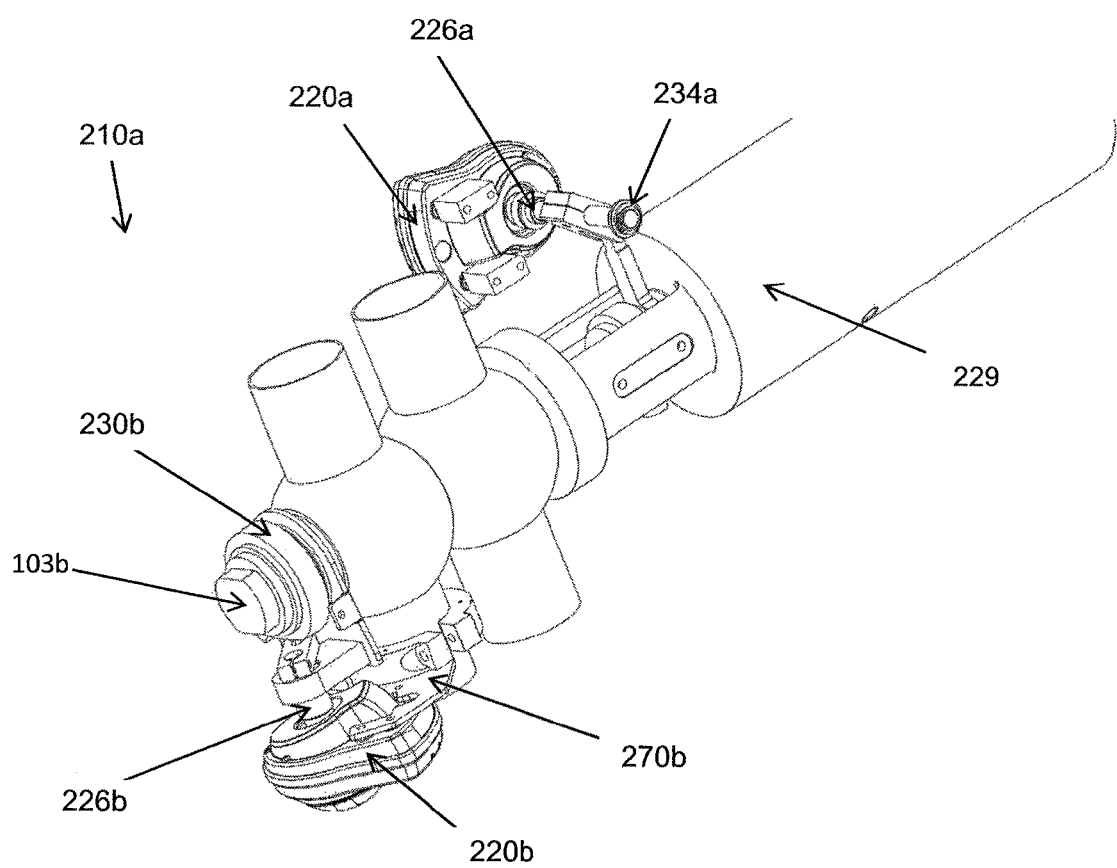
FIG. 9 shows how two wireless angular valve monitoring devices such as described in WO2008/078323 are attached to a piping structure having a linear valve assembly.

FIG. 9 shows how two wireless angular valve monitoring devices 220a and 220b respectively (such as described in WO2008/078323) are attached to a piping structure having a linear valve assembly. The two linear to angular converters 210a and 210b are somewhat mechanically different in structure and dimensions, to adapt to their two different locations respectively over the piping system.

The monitoring system of the present invention may also be used to predict future failures of either the actuator, each of the individual valves of the double valve, or of the respective O-rings that are used in each individual valve. As previously noted, PCT/IL2013/050494 discloses an Enhanced Valve Monitoring Device (EVMD) which is used, in addition to its monitoring function, also for predicting future failures in an actuator-valve pair assembly, where the actuator and valve are of rotational type (hereinafter, the term "Enhanced Valve Monitoring Device" will be briefly referred to a device having all the features as described in PCT/IL2013/050494). In brief, PCT/IL2013/050494 discloses: a system for determining a potential future failure of an actuator or valve that together control a fluid flow in a line, said control determines a rate of flow in the line by the actuator which in turn causes angular change to a stem of said valve between two respective valve states, the system comprises:
  a. a sensor for continuously sensing the angular orientation of the stem upon any angular change to said stem as caused by said actuator, and for conveying to a monitoring unit a respective angular variation signal; and
  b. an Enhanced Valve Monitoring Device (EVMD) which comprises:
    i. a local storage for storing nominal transitional values for said pair of actuator and valve;
    ii. a sampling unit for receiving said angular variation signal, and producing a transition vector which comprises periodical samples from said signal; and
    iii. a comparator unit for: (a) comparing at least a portion of said transitional vector with a corresponding set from said stored nominal transitional values; and (b) if a difference above one or more predefined threshold values is determined, issuing an alert for a potential failure of said actuator.

More specifically, according to PCT/IL2013/050494, a nominal transition curve which describes the angular change of orientation of the stem of the quarter turn valve is pre-stored. During actual operation of the actuator-valve pair, i.e., when the rotational actuator activates the quarter turn valve to change its state, the EVMD periodically samples the angular orientation of the stem during its transition between the two states to produce a transition vector. Then, a comparison between the transition vector and the nominal transition curve is performed, and when a difference above one or more predefined thresholds is determined, an alert for a possible future failure is issued. As noted, the system of PCT/IL2013/050494 is angular in its nature, as it relates to a rotational quarter turn valve, a corresponding rotational actuator, and an Enhanced Valve Monitoring Device which periodically samples the angular orientation of the stem of the valve.

The system of PCT/IL2013/050494 bases its determination of future failures on several observations, as follows:
  a. When an actuator is in order, it should perform the defined angular rotation change (for example from a closed state to an open state) within a nominal period. Specifications of actuators typically provide indications to this period, when used with various types of quarter turn valves, and at various operations situations.

b. When an actuator changes a state of a quarter turn valve, the angular change of the valve's stem with respect to time is essentially linear during the whole transition period between the two states, or at least the angular transition curve is well defined.

c. At the initial stage of an actuator fault, when the fault just begins to develop, the rate of the angular change of the stem during the transition begins to divert from said well defined curve. The EVMD of PCT/IL2013/050494 monitors said transition curve, and when a diversion from the nominal curve above a predefined threshold is detected, the EVMD issues an alert notifying that a failure begins to develop.

The same Enhanced Valve Monitoring Device of PCT/IL2013/050494, which is rotational its nature, is used in the present invention to predict future failures of: (a) the linear actuator, (b) each of the individual valves of the double valve, and (c) the O-rings that are used within each individual valve. The use of a rotational type Enhanced Valve Monitoring Device for predicting failures of linear components in the linear piping system becomes feasible in the present invention thanks to the linear to angular converters of the invention, that convert linear movements of the actuator and individual valves to a rotational notion that the EVMD such as taught in PCT/IL2013/050494 can sense.

In similarity to PCT/IL2013/050494, the prediction of failure by the system of the present invention is based on comparison between a nominal transitional curve, and an actual transitional vector.

FURTHER EXAMPLES

Figure 10:
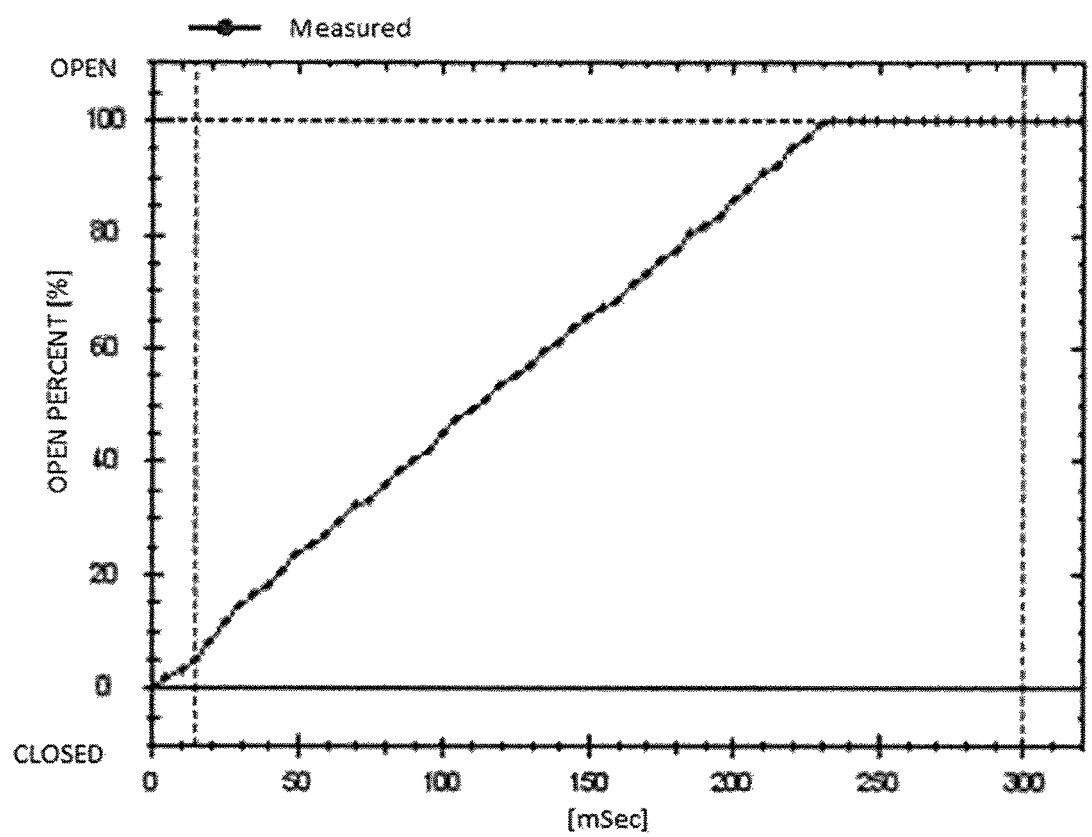
FIG. 10 shows a transitional vector from a closed state (0%) to an open state (100%) of a proper pair of actuator and double valve.
Figure 11:
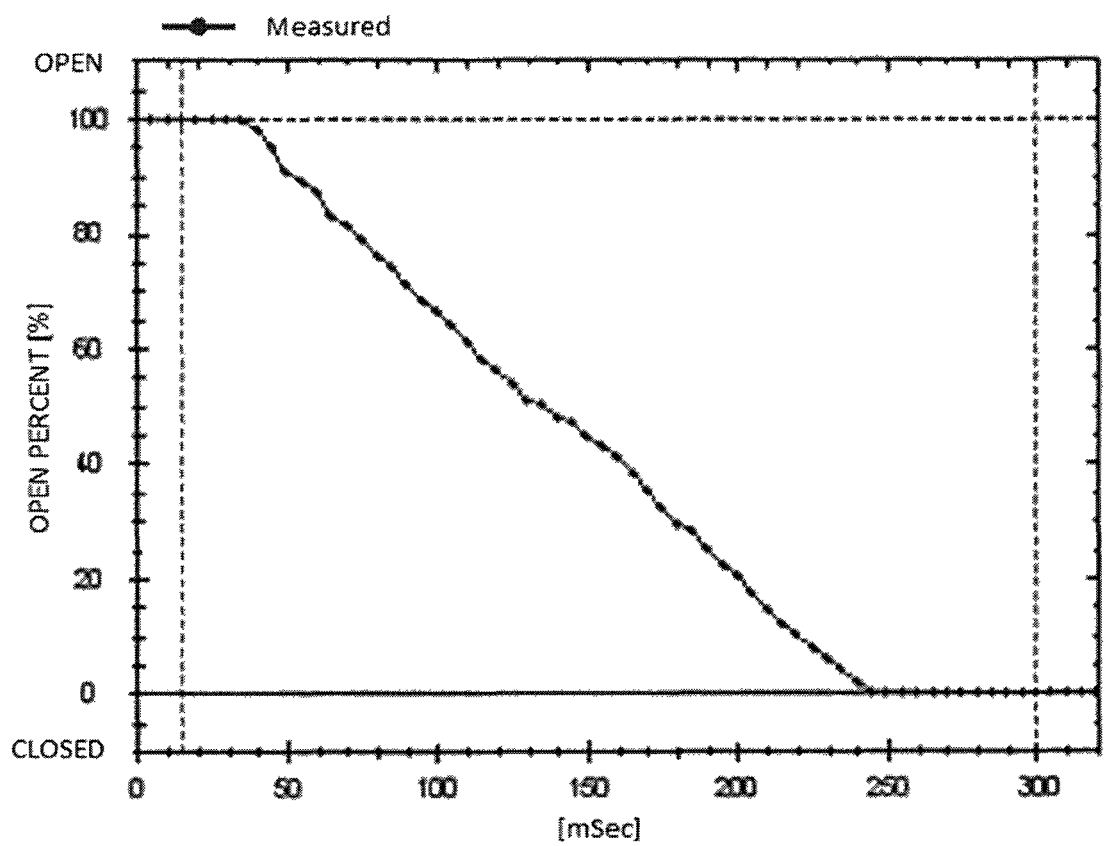
FIG. 11 shows a curve similar to the curve of FIG. 10, but it relates to a transition of the system from a closed to an open state.

FIG. 10 shows a transitional vector from a closed state (0%) to an open state (100%) of a proper actuator and double valve pair. It can be seen that the transfer takes about 230 ms, and that the transfer (displacement) is substantially linear in terms of time. When the transitional vector diverts from a linear curve by a predefined threshold, this is a sign for a possible future failure of one of the components within the pair. FIG. 11 shows a curve similar to the curve of FIG. 10, but it relates to a transition of the system from a closed to an open state.

Figure 12A:
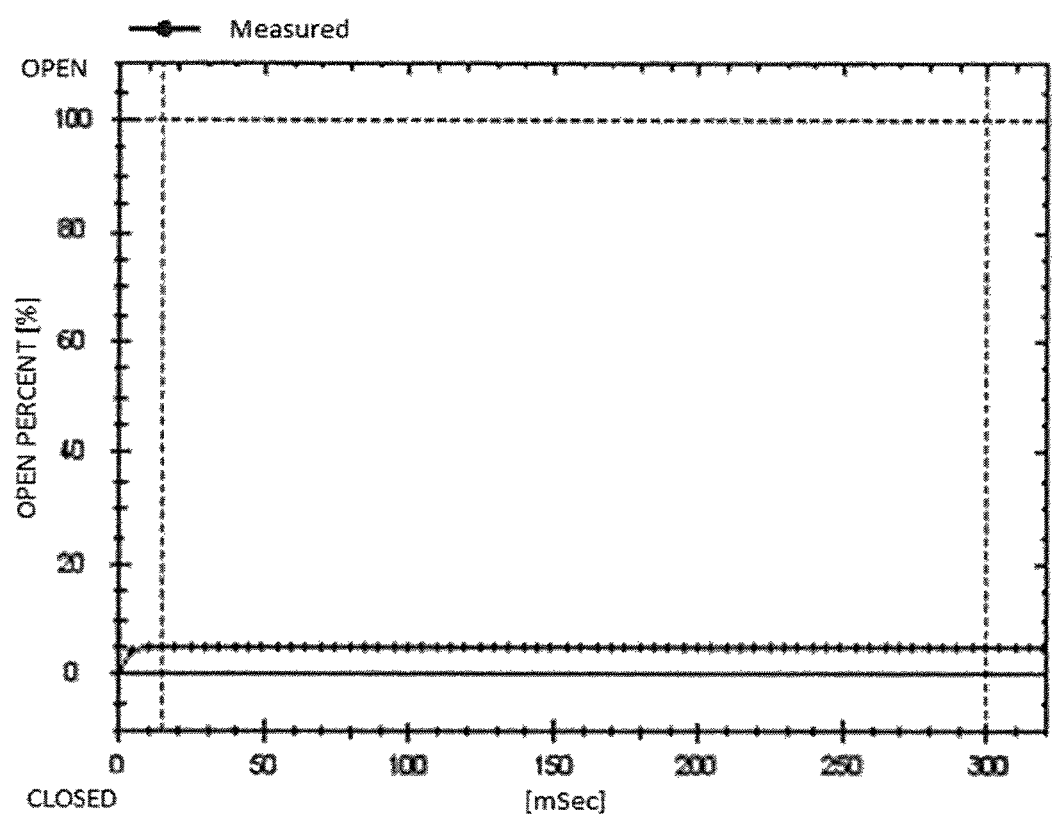
FIG. 12a shows a partial displacement (2-4 mm) in a first direction as performed during a CIP cycle in the system of the present invention.
Figure 12B:
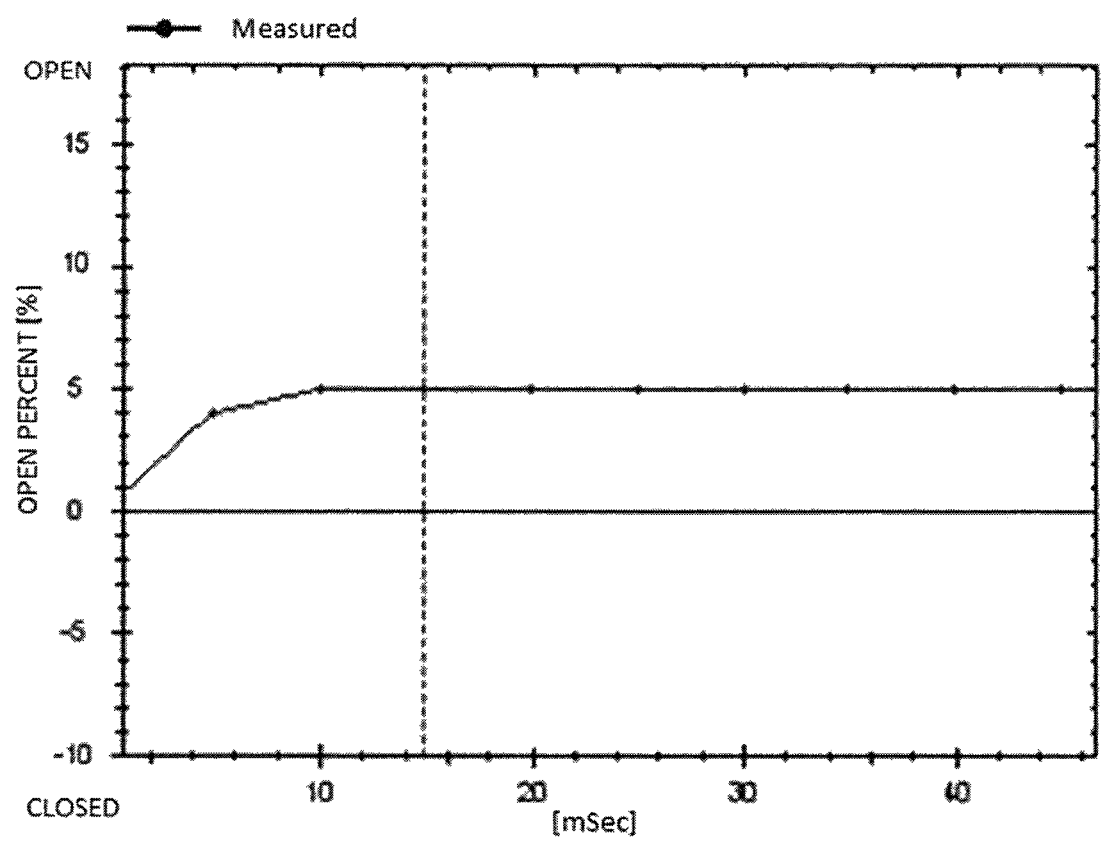
FIG. 12b shows the curve of FIG. 12a in an enlarged scale.
Figure 13:
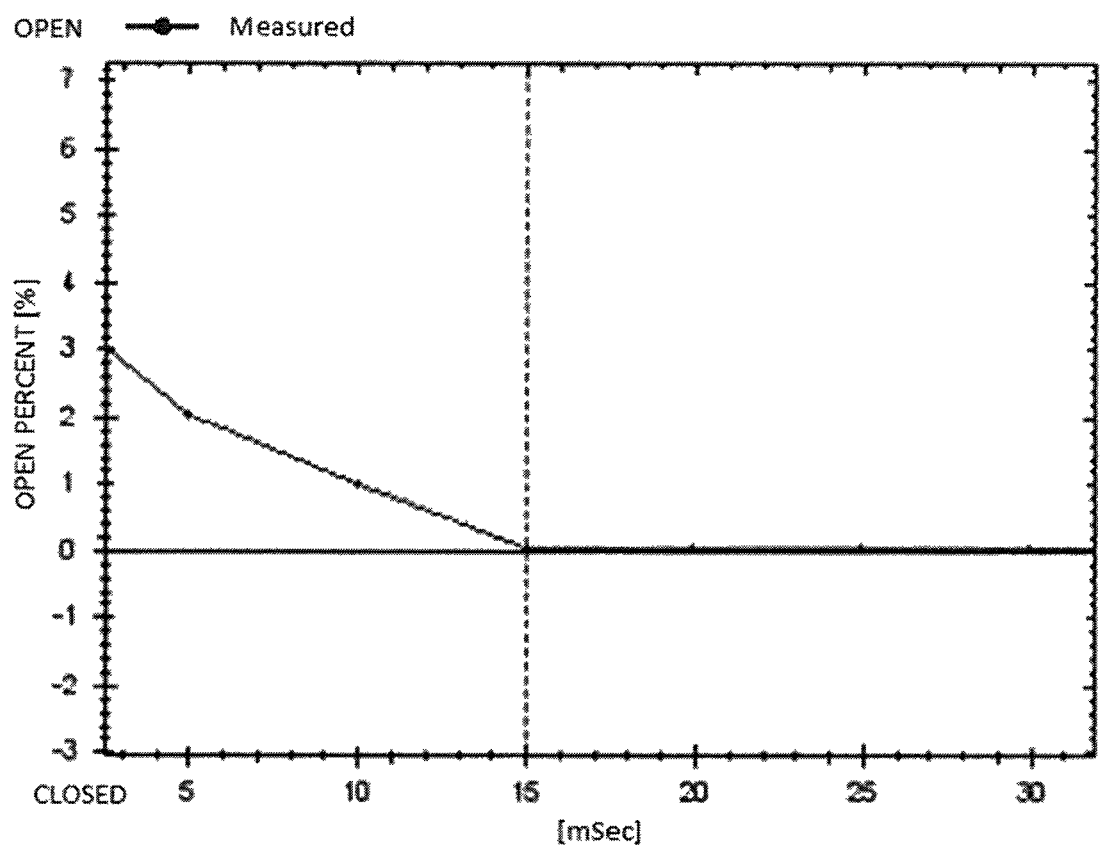
FIG. 13 shows the return of the valve of FIG. 12a to its original position.

FIG. 12a shows a partial displacement (2-4 mm) in a first direction as performed during a CIP cycle in the system of the present invention. As can be seen this partial displacement involves a 5% displacement, during about 5 ms. FIG. 12b shows the curve of FIG. 12a in an enlarged scale. FIG. 13 shows the return of the valve of FIG. 12a to its original position. It can be seen that in both of FIGS. 12a, 12b, and 13 the curves are substantially linear most of the transitional period.

Figure 14:
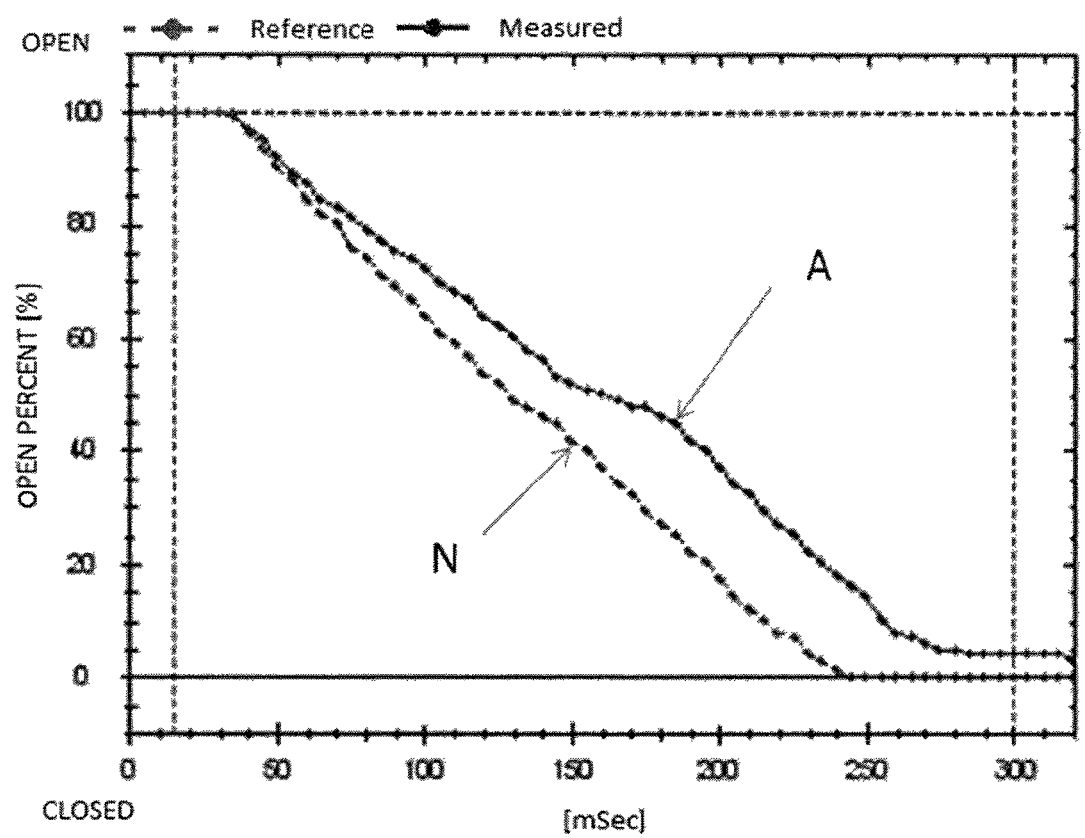
FIG. 14 shows a comparison between a nominal curve "N" of a proper valve and an actual curve "A" of a faulty valve.

FIG. 14 shows a comparison between a nominal curve "N" of a proper valve and an actual curve "A" of a faulty valve. It can be seen that the duration of the actual transfer of the faulty valve becomes longer, and the curve becomes non-linear at least during a part of the entire duration. It has been found that such a behavior is typical to a case where the O-ring is torn.

Figure 15:
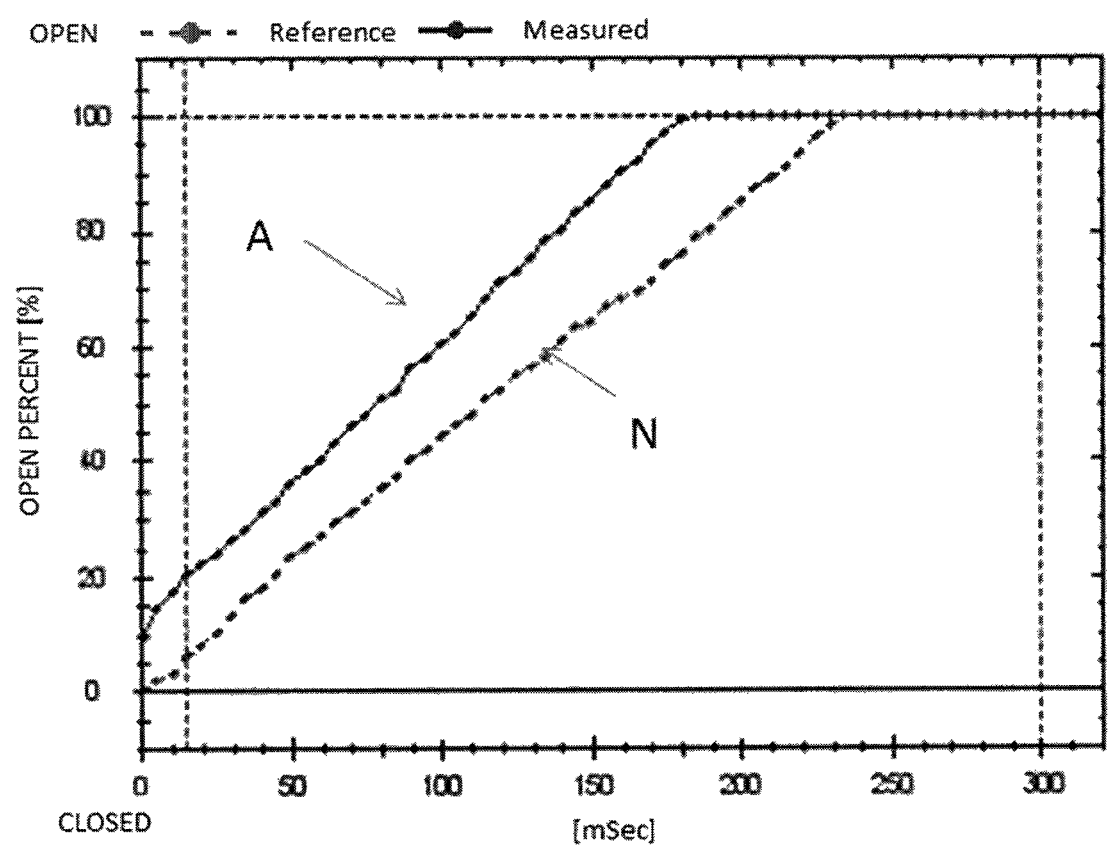
FIG. 15 shows still another comparison between a nominal curve "N" and an actual curve "A" that relate to a transfer of a linear valve from a closed (100%) to an open (0%) position.

FIG. 15 shows another comparison between a nominal curve "N" and an actual curve "A" that relate to a transfer of a linear valve from a closed (100%) to an open (0%) position. It can be seen that the movement of the valve has started at 10% since a damaged O-ring did not allow the valve to close to "0%" position. Since the valve started at 10%, it reached its 100% position faster (180 ms instead 230 ms in a not faulty valve). It has been found that such a behavior is typical to a case where a failure begins to develop due to a damaged O-ring.

The above are just few examples that show how a linear system which comprises a pair of linear valve and linear actuator can be monitored, and moreover how failures can be detected or predicted at their initial stages. Various of other failures can be detected at their initial stages, upon inspection and comparison between the actual and nominal curves.

Moreover, the application above provides some examples with respect to the structure of the linear to angular converter. Various other linear to angular structures may be similarly developed by skilled engineers. In one example, the converter may comprise one or more gears, rather than said first and second transfer elements.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. A system for monitoring an operation of a linear actuator-valve pair and for detecting failures at their early development stages, which comprises:
    a. a linear valve for opening or closing a channel between two pipes;
    b. a linear actuator for driving said valve to either a closed or an open state by fully or partially displacing a stem of said valve;
    c. an angular wireless valve monitoring device for monitoring the status of said pair by inspecting an angular orientation of a main shaft, and for reporting said status to a control center; and
    d. a linear to angular converter for converting said linear displacement of said stem to an angular progression of said main shaft.

2. The system according to claim 1, wherein said linear to angular converter comprises:
    a. a second transfer element having two ends, wherein at its first end said second transfer element is attached to said valve stem and at its second end said second transfer element is hingedly attached to a first transfer element; and
    b. a first transfer element which is hingedly attached to said second transfer element, and is also attached to a first end of said main shaft, said main shaft being connected at its other end to said angular wireless valve monitoring device.

3. The system according to claim 1, wherein said linear valve is a double valve which comprises two individual valves, and wherein said actuator is capable of either simultaneously driving both of said two individual valves, or of individually driving one of said individual valves.

4. The system according to claim 3, wherein two linear to angular converters and two valve monitoring devices are used to monitor both of said individual valves of said double valve.

5. The system according to claim 2, wherein said second transfer element is attached to the stem by means of a ring at its end, which grips said stem.

6. The system according to claim 5, wherein said ring is openable to encompass said stem, thereby to provide a system which is an add-on system.

7. The system according to claim 3 wherein one of said individual valves is individually and partially displaced during a CIP procedure to a space within one of said pipes, for flushing said respective valve by water and detergent, wherein the other individual valve remains in a closed state, closing said channel.

8. The system according to claim 7, wherein said partial displacement is in the order of 3-5 mm.

9. The system according to claim 1, wherein said full displacement is in the order of 20-30 mm or more.

10. The system according to claim 3, wherein each of said individual valves comprises an O-ring capable of sealing said channel, when said individual valve is in said closed state.

11. The system according to claim 1, wherein said angular valve monitoring device is an enhanced angular valve monitoring device which is used for both a purpose of monitoring the status of the valve and for a purpose of failure detection and prediction.

12. The system according to claim 11, wherein said enhanced angular valve monitoring device comprises:
   a. a local storage for storing nominal transitional values for said pair of actuator and valve;
   b. a sampling unit for receiving an actual angular variation signal from a sensor on a main shaft, and producing a transition vector which comprises periodical samples from said signal; and
   c. a comparator unit for: (i) comparing at least a portion of said transitional vector with a corresponding set from said stored nominal transitional values; and (ii) if a difference above one or more predefined threshold values is determined, issuing an alert for a potential failure of said actuator.

13. The system according to claim 12, wherein said transition vector is transmitted to a control center, and wherein a comparison between said nominal transitional values and said transitional vector is performed at the control center.

14. The system according to claim 10, wherein said enhanced angular valve monitoring device predicts and determines failure in at least one of:
   a. the linear valve;
   b. each of individual linear valves, when a double valve is used;
   c. one or more O-rings used in one or more of said valves; and
   d. the linear actuator.

15. The system according to claim 11, wherein two linear to angular converters and two valve monitoring devices are used respectively to monitor both of said individual valves of said double valve.

16. The system according to claim 1, wherein said linear to angular converter comprises one or more gears, for converting a linear displacement to an angular displacement.

* * * * *